United States Patent [19]

Schambre

[11] Patent Number: 5,613,699
[45] Date of Patent: Mar. 25, 1997

[54] INSTRUMENT PANEL ASSEMBLY WITH MOUNTING FOR AIR BAG CANISTER

[75] Inventor: John Schambre, Canton, Mich.

[73] Assignee: Chrysler Corporation, Auburn Hills, Mich.

[21] Appl. No.: 516,080

[22] Filed: Aug. 17, 1995

[51] Int. Cl.⁶ ................................................. B60R 21/16
[52] U.S. Cl. ........................................ 280/728.2; 280/732
[58] Field of Search ............................. 280/728.2, 732; 180/90

[56] References Cited

U.S. PATENT DOCUMENTS

| 5,088,571 | 2/1992 | Burry et al. | 180/90 |
| 5,311,960 | 5/1994 | Kukainis et al. | 180/90 |
| 5,407,226 | 4/1995 | Lauritzen et al. | 280/732 |
| 5,425,550 | 6/1995 | Paxton et al. | 280/732 |
| 5,431,433 | 7/1995 | Steimke et al. | 280/728.3 |
| 5,511,819 | 4/1996 | Spiker et al. | 280/728.2 |
| 5,516,145 | 5/1996 | Williams et al. | 280/728.2 |
| 5,533,746 | 7/1996 | Whited | 280/728.2 |
| 5,533,747 | 7/1996 | Rose | 280/728.2 |

Primary Examiner—Paul N. Dickson
Attorney, Agent, or Firm—Edward A. Craig

[57] ABSTRACT

An instrument panel has a recess in which a passenger air bag canister is mounted. The mounting includes a flange on the bottom wall of the canister fastened to the instrument panel. The mounting also includes an elongated horizontal rib on the canister and an elongated horizontal slot in the recess which receives the rib. As a further option, brackets on the end caps of the canister may be fastened to the instrument panel.

7 Claims, 4 Drawing Sheets

INSTRUMENT PANEL ASSEMBLY WITH MOUNTING FOR AIR BAG CANISTER

FIELD OF INVENTION

This invention relates generally to instrument panel assemblies and more particularly to an instrument panel having a mounting for an air bag canister.

BACKGROUND AND SUMMARY

The canister for the passenger air bag on an automotive vehicle typically is mounted on the instrument panel by numerous fasteners, reaction plates, beams and/or tubing, all increasing the time required for assembly and or replacement, adding to the problems of fit and finish, and producing objectionable noise incident to vehicle travel.

In accordance with the present invention, the canister for the passenger air bag is mounted with a minimum of parts. For mounting purposes, the canister preferably has an elongated, generally horizontal rib which fits into a slot in the instrument panel. To complete the mounting, fasteners preferably attach a flange on the canister to the instrument panel. No additional mounting means are required, although the end caps of the canister may also be fastened to the instrument panel, if desired.

In a preferred embodiment about to be described, the instrument panel has a rearwardly opening recess in which the air bag canister is mounted. The mounting means for the canister comprises a flange on the bottom wall of the canister which is secured by fasteners to the instrument panel. The mounting also includes an elongated generally horizontal rib on the canister and an elongated generally horizontal slot on the front wall of the recess in which the rib is received.

One object of this invention is to provide an instrument panel assembly with a mounting for an air bag canister having the foregoing features and capabilities.

Another object is to provide an instrument panel assembly and mounting for an air bag canister which is composed of a relatively few simple and inexpensive parts, is durable and reliable in use, and is capable of being readily manufactured, assembled and installed.

Other objects, features and advantages of the invention will become more apparent as the following description proceeds, especially when considered with the accompanying drawings.

DETAILED DESCRIPTION OF PREFERRED EMBODIMENTS

Figure 1:
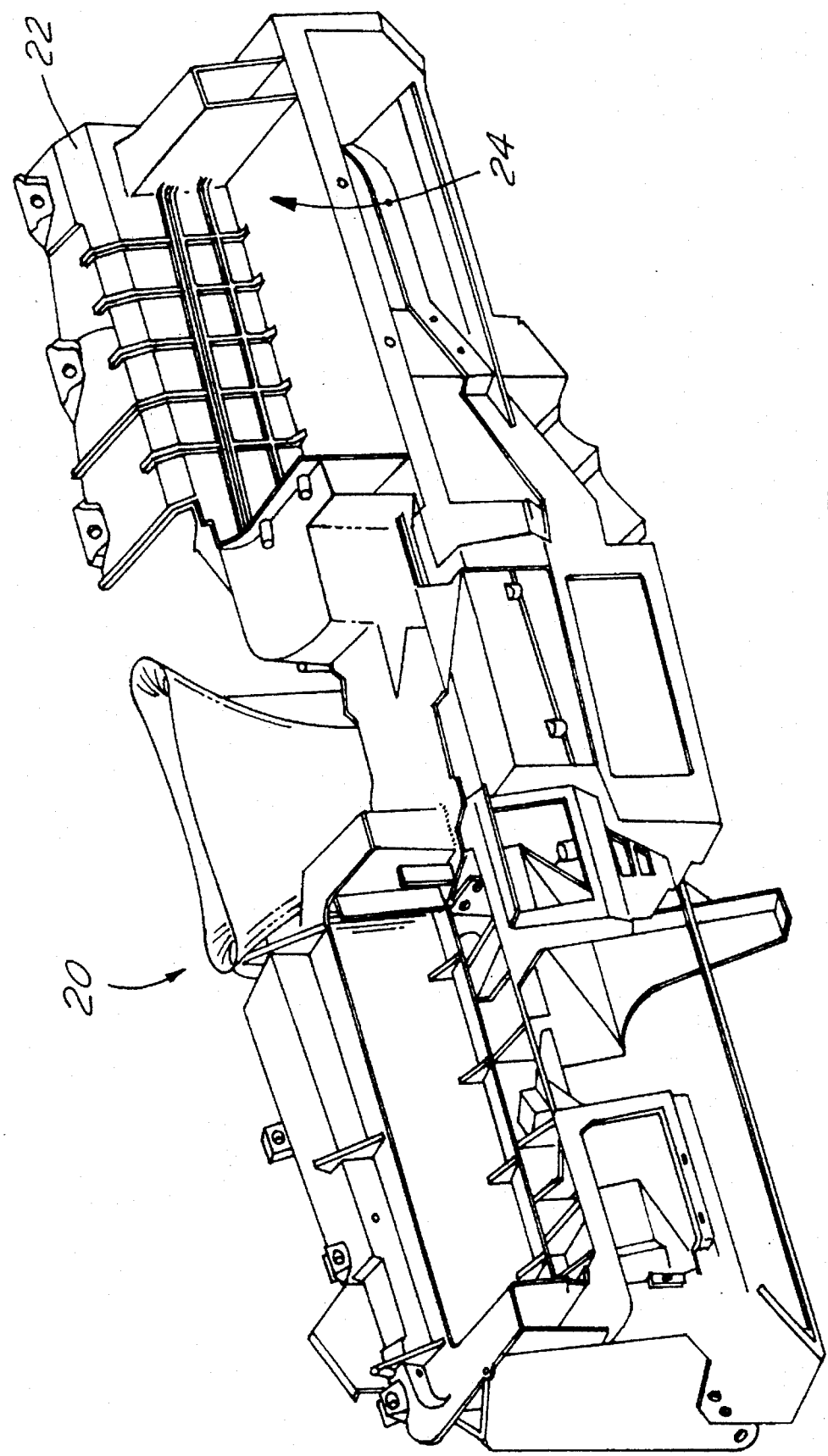
FIG. 1 is a perspective view of an instrument panel constructed in accordance with the invention, with the decorative trim covering and all of the instruments and components removed, and with a recess for receiving an air bag canister.
Figure 2:
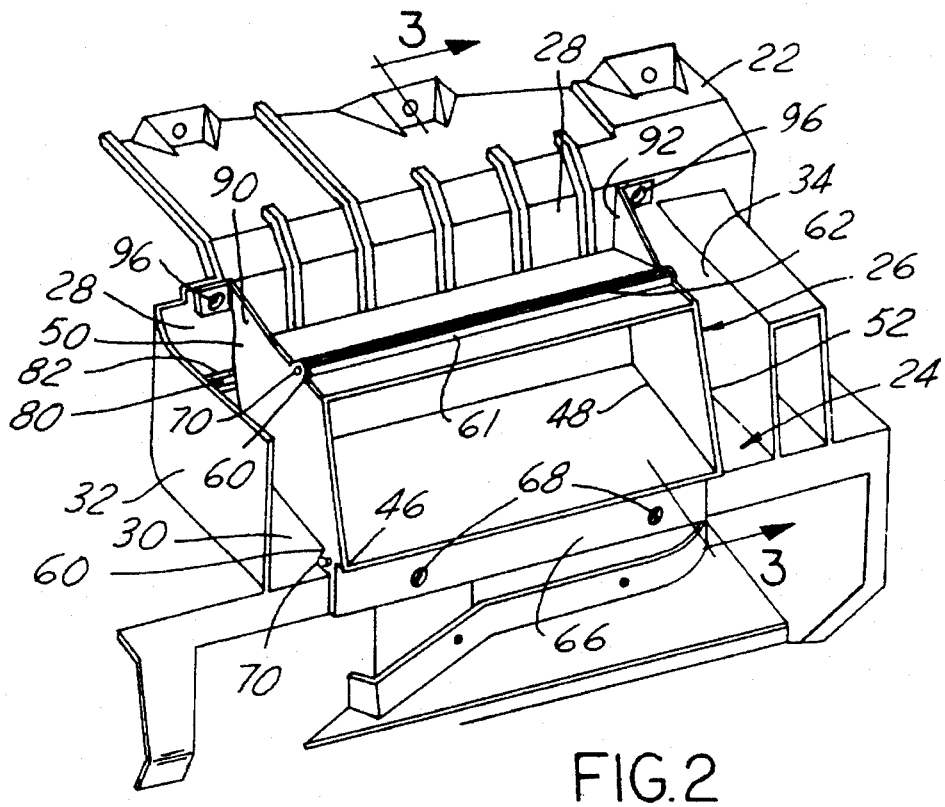
FIG. 2 is an enlarged fragmentary view of a portion of FIG. 1 showing an air bag canister mounted in the recess in the instrument panel in accordance with the invention.
Figure 3:
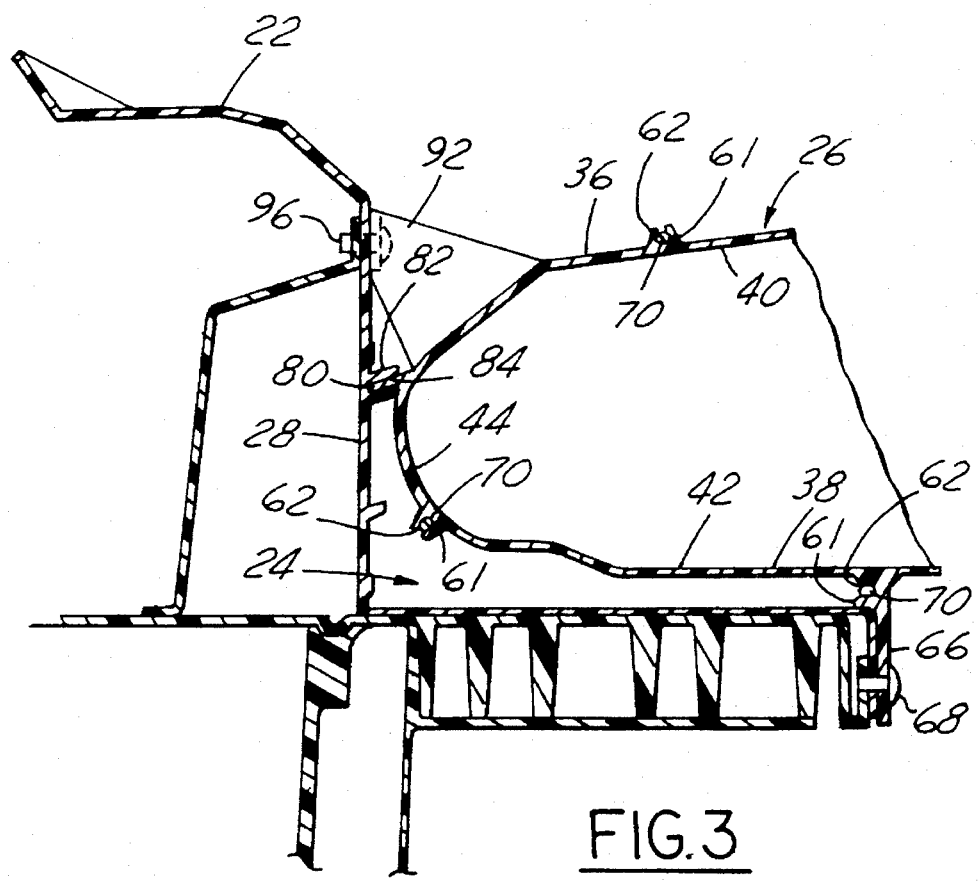
FIG. 3 is a sectional view taken on the line 3—3 in FIG. 2.

Referring now more particularly to the drawings, and especially to FIGS. 1–3, an instrument panel assembly 20 includes an instrument panel 22 which is shown in FIG. 1 without any instruments or components attached thereto and without the usual decorative cover layer of vinyl or the like. The instrument panel 22 has a rearwardly opening recess 24 on the passenger side for receiving the passenger air bag canister 26.

The instrument panel 22 is preferably made of a resinous plastic material such, for example, as polypropylene or acrylonitrile-butadiene-styrene (ABS) and polycarbonate.

The recess 24 has a vertical front wall 28 and a horizontal bottom wall 30 extending rearwardly from the lower edge of the front wall. The recess 24 has laterally spaced vertical end walls 32 and 34, and is open at the top and rear.

The canister 26 has a body 36 which, as seen in FIG. 3, is a generally C-shaped extrusion preferably made of aluminum, for example. The body 36 is in the form of a transverse wall 38 which has a top wall portion 40, a bottom wall portion 42, and a front wall portion 44. The opposite end edges 46 and 48 are laterally spaced apart and disposed in vertical planes.

The canister 26 has an end caps 50 and 52 which engage the opposite end edges 46 and 48 of the body and thus close the ends of the canister. The body 36 and end caps 50 and 52 of the canister define a chamber for an air bag. The chamber may be closed by a deployment door, not shown. The end caps have integral marginal tabs 60 and the body 36 has continuous, horizontal channels 61 which extend for the full length of the body and provide slots 62 aligned with the tabs. Threaded fasteners 70 extend through openings in the tabs and self-tap into the slots 62 to secure the end caps to the body.

The bottom wall portion 42 of the body 36 has an integral vertical flange 66 which extends the full width of the bottom wall and projects downwardly from the rear edge thereof.

The canister 26 is mounted in the recess 24 with its front wall portion 44 adjacent to the front wall 28 of the recess and its bottom wall portion 42 overlying and adjacent to the bottom wall 30 of the recess. The flange 66 on the body of the canister is secured by fasteners 68 to the instrument panel just below the rear of the bottom wall 30 of the recess.

An elongated, generally horizontal, rectangular rib or blade 80 projects forwardly from the front wall 44 of the body of the canister from one end edge 46 to the other end edge 48. An elongated, generally horizontal channel 82 projecting rearwardly from the front wall 28 of the recess defines a rectangular slot 84 which is of the same dimensions as the rib and registers with and receives the rib. The outer edge of the rib bottoms in the slot. The slot 84 is continuous and of the same length as the rib 80 and thus receives the rib along its full length. When the air bag deploys, the rib and slot spread the load over the full width of the canister. The rib 80 and slot 84 are preferably inclined downwardly and forwardly as shown so that the rib can be inserted easily by a rocking motion as the flange 66 is placed in position against the instrument panel for attachment.

Integral brackets 90 and 92 project upwardly and forwardly from the end caps 50 and 52 and are secured to the instrument panel 22 by fasteners 96 at points above the slot 84 and adjacent to the upper edge of the front wall 28 of the recess.

The installation of the air bag canister is a simple matter. The canister is inserted into place so that the rib 80 engages in the slot 84 and the flange 66 and brackets 90 and 92 are aligned with suitable openings in the instrument panel for insertion of the fasteners 68 and 96, as shown. Only a few simple parts are required for the installation which may be accomplished quickly and easily. Problems of fit and finish, buzz and squeak and other noises are thus minimized.

Figure 4:
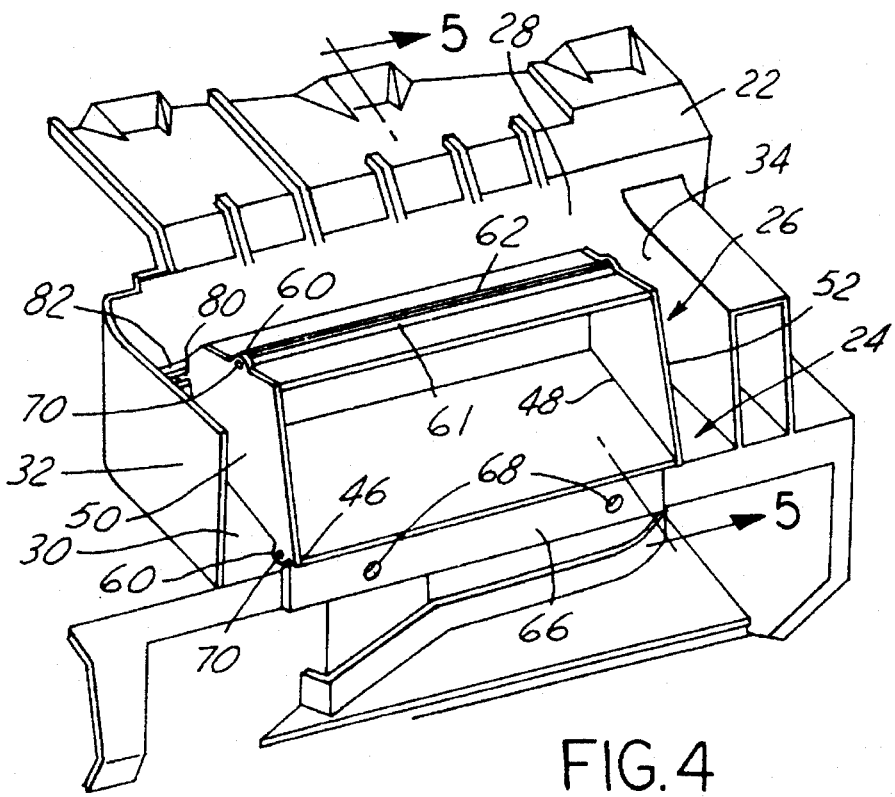
FIG. 4 is a view similar to FIG. 2 but showing a modification.
Figure 5:
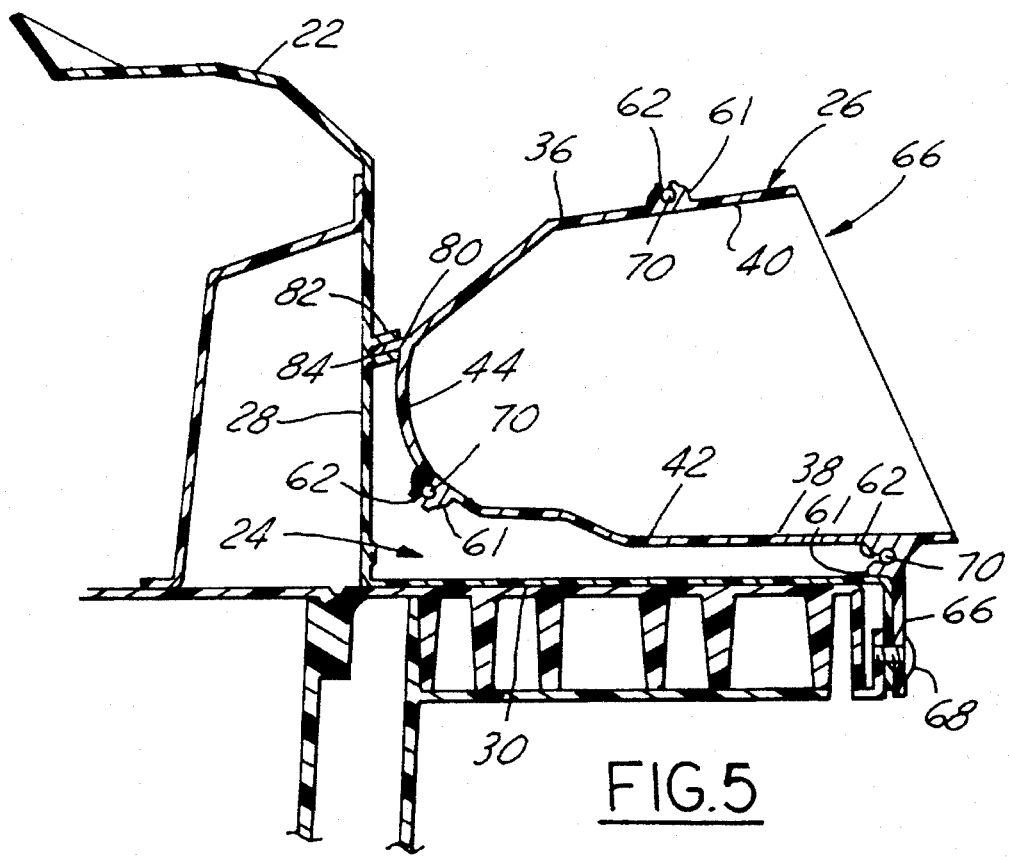
FIG. 5 is a sectional view taken on the line 5—5 in FIG. 4.
Figure 6:
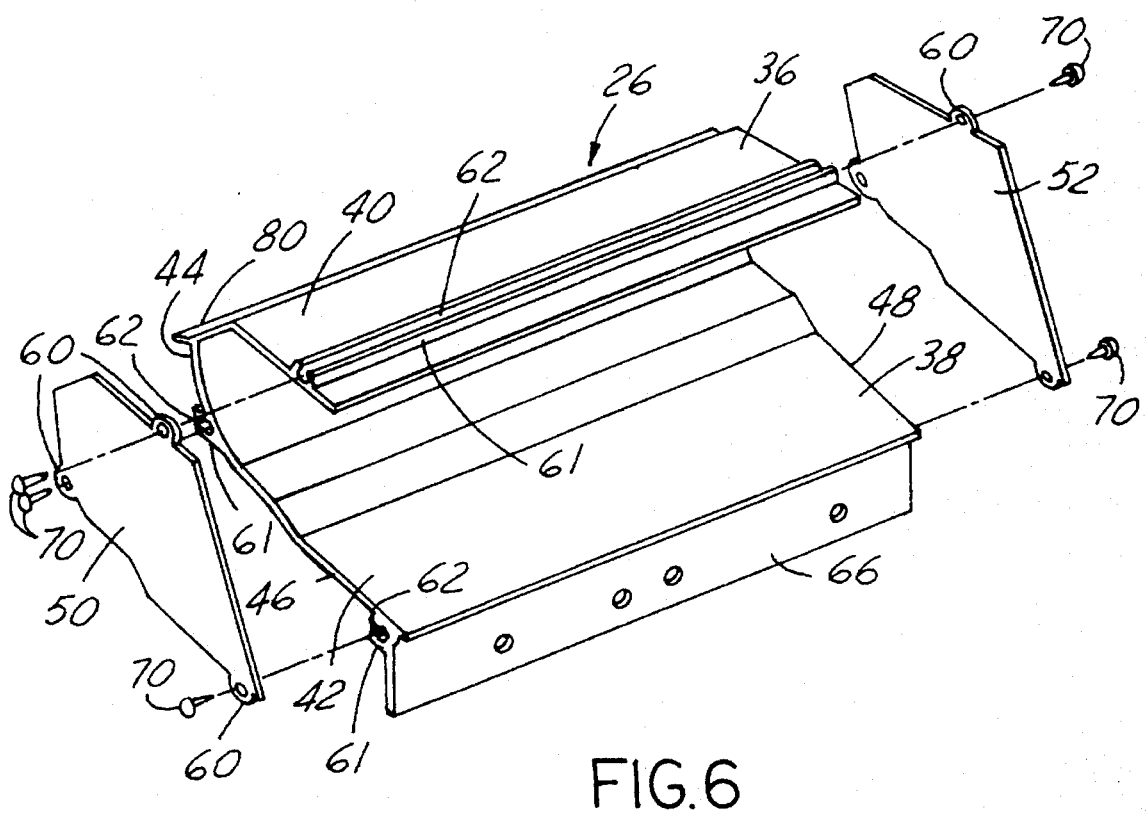
FIG. 6 is an exploded view of the air bag canister shown in FIGS. 4 and 5.

FIGS. 4–6 show a modification of the invention in which the brackets 90 and 92 on the end plates are omitted. This construction further reduces the number of parts required for the installation. It has been found that the canister may be even more quickly installed or removed and replaced when the brackets are eliminated. The fasteners for attaching flange 66 are readily accessible. Brackets in most instances are not required for a secure and adequate mounting of the air bag canister. However, the brackets may be utilized if desired or if found to be useful in a particular application. The construction in FIGS. 4–6 is the same as in FIGS. 2 and 3, except for the elimination of the brackets and corresponding parts are identified by the same reference numbers.

What is claimed is:

1. An instrument panel assembly comprising an instrument panel having a rearwardly opening recess defined at least in part by a generally upright front wall and a bottom wall extending rearwardly therefrom, an air bag canister having a generally upright front wall and a bottom wall extending rearwardly therefrom, means mounting said canister in said recess with its front wall adjacent the front wall of said recess and its bottom wall adjacent the bottom wall of said recess, said mounting means comprising a flange on the bottom wall of said canister, means for securing said flange to the instrument panel, an elongated generally horizontal rib on the front wall of said canister, and an elongated generally horizontal slot on the front wall of said recess in which said rib is received.

2. An instrument panel assembly as defined in claim 1, wherein the front wall of said canister has laterally spaced end edges, said rib extends continuously substantially from one end edge of the front wall of said canister to the other, and said slot receives substantially the full length of said rib.

3. An instrument panel assembly as defined in claim 2, and further including means securing said canister to the front wall of said recess at a point above said slot.

4. An instrument panel assembly comprising an instrument panel having a rearwardly opening recess defined at least in part by a generally upright front wall and a bottom wall extending rearwardly therefrom, an air bag canister comprising a body having a transverse wall provided with laterally spaced end edges, end caps engaging said end edges and cooperating with said transverse wall in defining a chamber for an air bag, means securing said end caps to said transverse wall, said transverse wall of said canister having a generally upright front wall portion and a bottom wall portion extending rearwardly from said front wall portion, means mounting said canister in said recess with its front wall portion adjacent the front wall of said recess and its bottom wall portion adjacent the bottom wall of said recess, said mounting means comprising a flange on the bottom wall portion of the transverse wall of said canister, means securing said flange to the instrument panel, an elongated, generally horizontal rib on the front wall portion of the transverse wall of said canister, and an elongated, generally horizontal slot on the front wall of said recess in which said rib is received.

5. An instrument panel assembly as defined in claim 4, wherein said rib extends continuously substantially from one said end cap to the other, and said slot is formed in a channel on the front wall of the recess and is substantially equal in length to said rib and receives substantially the full length of said rib.

6. An instrument panel assembly as defined in claim 5, and further including brackets on said respective end caps located above said rib, and means securing said brackets to said instrument panel.

7. An instrument panel assembly comprising an instrument panel having a rearwardly opening recess defined at least in part by a generally upright front wall and a bottom wall extending rearwardly therefrom, an air bag canister having a generally upright front wall and a bottom wall extending rearwardly therefrom, means mounting said canister in said recess with its front wall adjacent the front wall of said recess and its bottom wall adjacent the bottom wall of said recess, said mounting means comprising a flange on the bottom wall of said canister, means for securing said flange to the instrument panel, an elongated, generally horizontal rib element and an elongated, generally horizontal slot element in which the rib element is received, one of the rib and slot elements being provided on the front wall of the canister and the other of the rib and slot elements being provided on the front wall of said recess.

* * * * *